Patented July 6, 1954

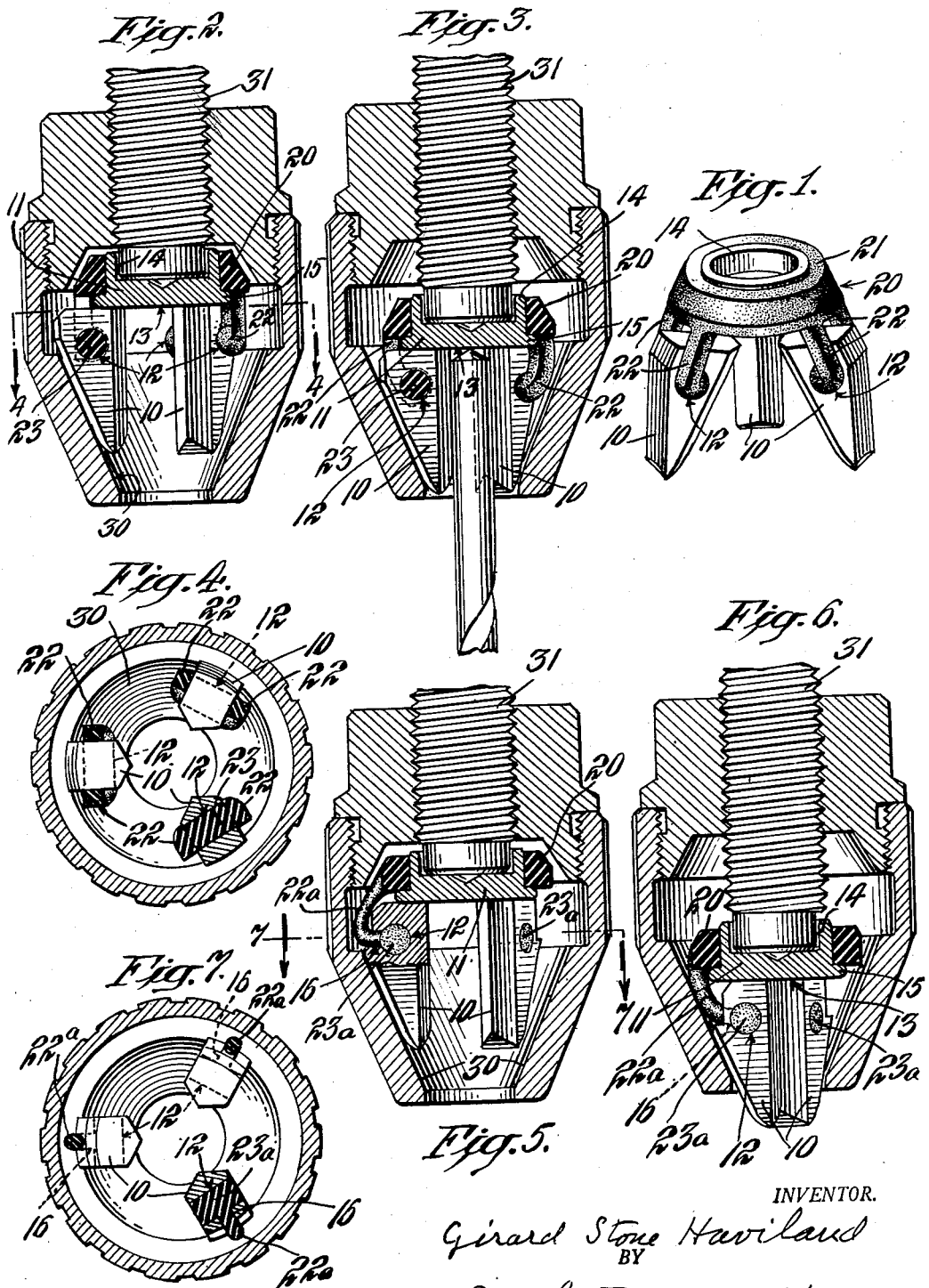

2,683,041

UNITED STATES PATENT OFFICE 2,683,041

COLLET FOR CHUCKS

Girard Stone Haviland, Unionville, Conn., assignor, by mesne assignments, to The Jacobs Manufacturing Company, West Hartford, Conn., a corporation of New Jersey Application February 27, 1952, Serial No. 273,622

11 Claims. (Cl. 279—39)

This invention relates to collets for chucks, and provides a simple and inexpensive collet particularly desirable for use in the chucks of hand drills and similar tools.

A particular object of the invention is to provide a compact collet which permits an unusually large radial movement of the jaws in relation to the size of the jaws, making possible a very compact chuck assembly for a given range of capacity.

In accordance with the invention, the jaws of the collet are secured together by a body of elastic material, such as synthetic rubber, which is located almost entirely behind the rear ends of the jaws so that it in no way interferes with closing movements of the outer ends of the jaws and cannot be damaged if a tool is incorrectly inserted between a pair of jaws instead of centrally located in relation to the set of three jaws.

The invention may best be understood from a detailed description of the specific embodiment shown in the drawings, in which:

Fig. 1 is a perspective view of a collet embodying the invention in the form which it has before being confined by the chuck;

Fig. 2 is an axial section showing a chuck containing the collet of Fig. 1 in open position;

Fig. 3 is a similar view showing the collet partly closed and gripping a drill shank;

Fig. 4 is a section on the line 4—4 of Fig. 2; and

Figs. 5, 6 and 7 are views similar to Figs. 2, 3 and 4 showing a modified construction.

The collet shown in the drawings consists of three metal jaws 10, a metal plug 11 and a single piece 20 of elastic material, such as synthetic rubber, connecting each of the jaws 10 with the plug 11.

The jaws 10 are of the usual triangular form with conical external faces so that they may be forced together when they are pressed into a conical surface 30. Each jaw 10 has a transverse bore 12 near its rear end.

The plug 11 is cylindrical in form. It has a flat front end face 13 for engaging the rear end surfaces of the jaws and a recessed rear end face 14 for receiving a pressure screw 31. The plug may also be provided with an annular flange 15 for a purpose hereinafter noted.

The elastic piece 20 is formed to constitute three parts: (1) an annular body 21 which embraces the plug 11, (2) pairs of arms 22 which extend from the periphery of the annular body in a direction generally parallel to the axis of the body, but most desirably flaring outwardly a little when not under a strain, as shown in Fig. 1, and (3) cylindrical cross-pieces 23 each of which connects the outer ends of one of the pairs of arms and extends through the bore in one of the jaws 10.

By the arrangement described, the jaws 10 are interlocked with the arms 22 and thus permanently connected to the rubber piece 20 without bonding the rubber to the metal of the jaws. It is merely necessary to place the jaws in the mold in which the rubber piece is formed so that the rubber may be forced through the bores 12 to form the cross-pieces 23. The absence of bonding results in economy of manufacture. It has the further advantage of allowing a pivotal movement of the jaws on the cross-pieces 23 which prevents movements of the jaws from placing undue twisting strains on the rubber arms 22.

The central opening in the annular body 21 of the piece 20 is most desirably formed originally of slightly less diameter than the plug 11, so that, when the body is placed around the plug, it embraces it elastically. It is thus held firmly upon it.

When the collet is placed in the chuck body as shown in Figs. 2 to 4, the rubber arms 22 hold the inner portions of the back surfaces of the jaws 10 against the front face 13 of the thrust plug 11 and the outer surfaces of the jaws against the conical surface 30. When the chuck is closed completely, or partly as shown in Fig. 3, by turning in the screw 31, the rubber arms 22 are lengthened and placed under tension so that they will separate the jaws and keep them in contact with the conical surface 30 when the screw 31 is turned backward to release the pressure of the plug 11. To prevent this tension from causing the annular body 21 to slip forward on the plug 11, it is desirable to form the annular flange 15 at the front end of the plug. The flange is low enough so that the arms 22 may pass around it even when the chuck is completely closed.

The extent to which the construction described has achieved the principal object of the invention is particularly apparent from the sectional view Fig. 4 which shows that the spaces between the side surfaces of the jaws are almost entirely unobstructed by the rubber so as to permit large approaching movements and consequently large radial movements of the jaws.

A modification in which the spaces between the sides of the jaws are entirely unobstructed is shown in Figs. 5, 6 and 7. In this case the double arms 22 are replaced by single arms 22a, each of which is T-shaped with a cross-piece 23a at its end. Each jaw has a bore 16 extending from its back surface to its transverse bore 12. The outer portion of each arm 22a and its cross-piece 23a is molded in the bores 16 and 12 so that an interlock between the jaws and the rubber is provided. As shown in Fig. 7 no part of the rubber lies between the side faces of adjacent jaws.

What I claim is:

1. A collet for a chuck, comprising a metal plug, a single piece of non-metallic elastic material constituting an annulus elastically embracing the plug and a number of equally spaced arms extending from the periphery of the annulus and approximately parallel to the axis of the plug, and an equal number of metal jaws whose rear portions are mounted on the free ends of said arms, the spaces between the jaws being substantially unobstructed by the elastic material.

2. A collet for a chuck, comprising a circular metal plug, a single piece of non-metallic elastic material constituting an annulus embracing the plug and a number of pairs of arms extending from the periphery of the annulus in a direction approximately parallel to the axis of the plug, and metal jaws each having its rear portion mounted in the outer part of one of said pairs of arms, the spaces between the jaws being substantially unobstructed by the elastic material.

3. A collet for a chuck, comprising a circular metal plug, a single piece of non-metallic elastic material constituting an annulus embracing the plug and a number of T-shaped arms extending from the periphery of the annulus, and metal jaws each having in its rear portion a T-shaped hole enclosing the outer part of one of said arms, the space between the jaws being entirely unobstructed by the elastic material.

4. A collet for a chuck, comprising a metal plug, a number of jaws having their rear ends in contact with an end face of the plug and having transverse bores in their rear portions, and a single piece of non-metallic elastic material constituting an annulus embracing the plug and a number of pairs of arms extending from the periphery of the annulus and generally parallel to the axis of the plug and cylindrical cross-pieces each extending between the outer ends of one of the pairs of arms and passing through the bore in one of the jaws.

5. A unit assembly of jaws for a chuck, comprising a number of jaws having transverse bores near their rear ends, and a single piece of non-metallic elastic material constituting a body located behind the rear ends of the jaws and a number of arms extending from the periphery of the body and cross-pieces at the ends of the arms, each cross-piece passing through the bore in one of the jaws to interlock the elastic piece and the jaws.

6. A unit assembly of jaws for a chuck, comprising a number of jaws having transverse bores in their rear ends, and a single piece of non-metallic elastic material constituting an annulus and a number of pairs of arms extending from the periphery of the annulus and embracing the rear portions of the jaws and cross-pieces each extending between the outer ends of one of the pairs of arms and passing through the bore in one of the jaws.

7. A unit assembly for a chuck, comprising a number of jaws having T-shaped holes in their rear portions, and a single piece of non-metallic elastic material constituting an annulus and a number of T-shaped arms extending from the periphery of the annulus and interlocked with the T-shaped holes of the jaws.

8. A unit assembly of jaws for a chuck, comprising a single piece of non-metallic elastic material constituting an annulus and arms extending from the periphery of the annulus, and a number of jaws having their rear portions interlocked with the free ends of said arms.

9. A unit assembly of jaws for a chuck, comprising three metal jaws, and a single piece of non-metallic elastic material constituting an annulus and arms extending from the periphery of the annulus and interlocked with the rear portions of the jaws, the spaces between the jaws being substantially unobstructed by the elastic material.

10. A collet for a chuck, comprising the combination with a pressure plug and a number of jaws having their rear ends in contact with the front face of the plug, of an annulus encircling the plug and a number of extensible arms of non-metallic elastic material connecting the jaws with the annulus and extending forwardly from the annulus and around the front edge of the plug.

11. A collet for a chuck, comprising the combination of a pressure plug having an annular flange at its front end and a number of jaws having their rear ends in contact with the front face of the plug, an annulus encircling the plug, and a number of extensible arms of non-metallic elastic material connecting the jaws with the annulus and extending forwardly from the annulus and around the annular flange of the plug.

References Cited in the file of this patent

UNITED STATES PATENTS

| Number | Name | Date |
| --- | --- | --- |
| 1,953,637 | Smith et al. | Apr. 3, 1934 |

FOREIGN PATENTS

| Number | Country | Date |
| --- | --- | --- |
| 626,342 | Great Britain | 1949 |
| 626,343 | Great Britain | 1949 |